Aug. 4, 1959
M. G. GORROW
2,897,553
UTILITY POLE REINFORCEMENT
Filed Dec. 11, 1957
2 Sheets-Sheet 1
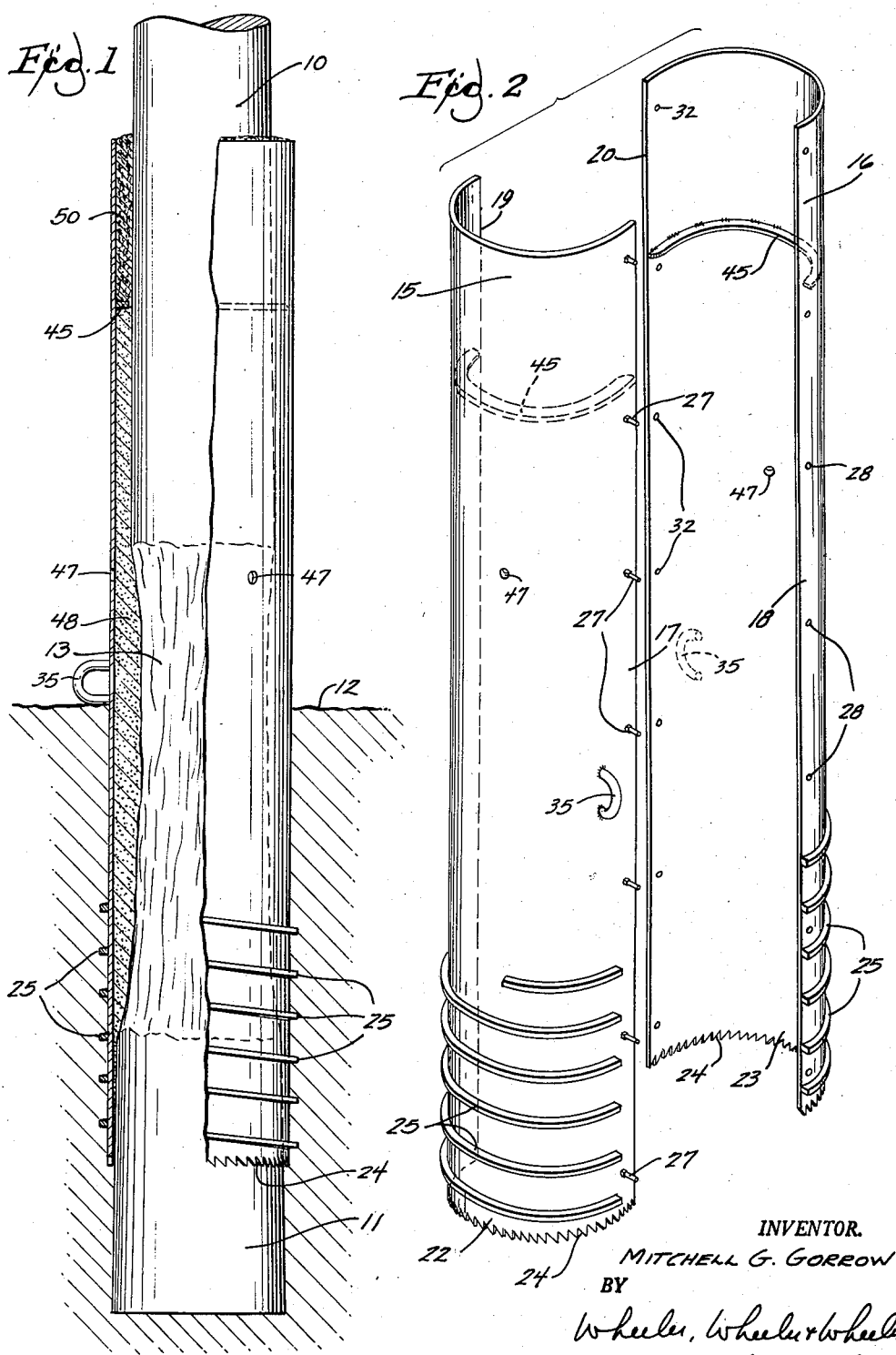
INVENTOR.
MITCHELL G. GORROW
BY
Wheeler, Wheeler & Wheeler
ATTORNEYS

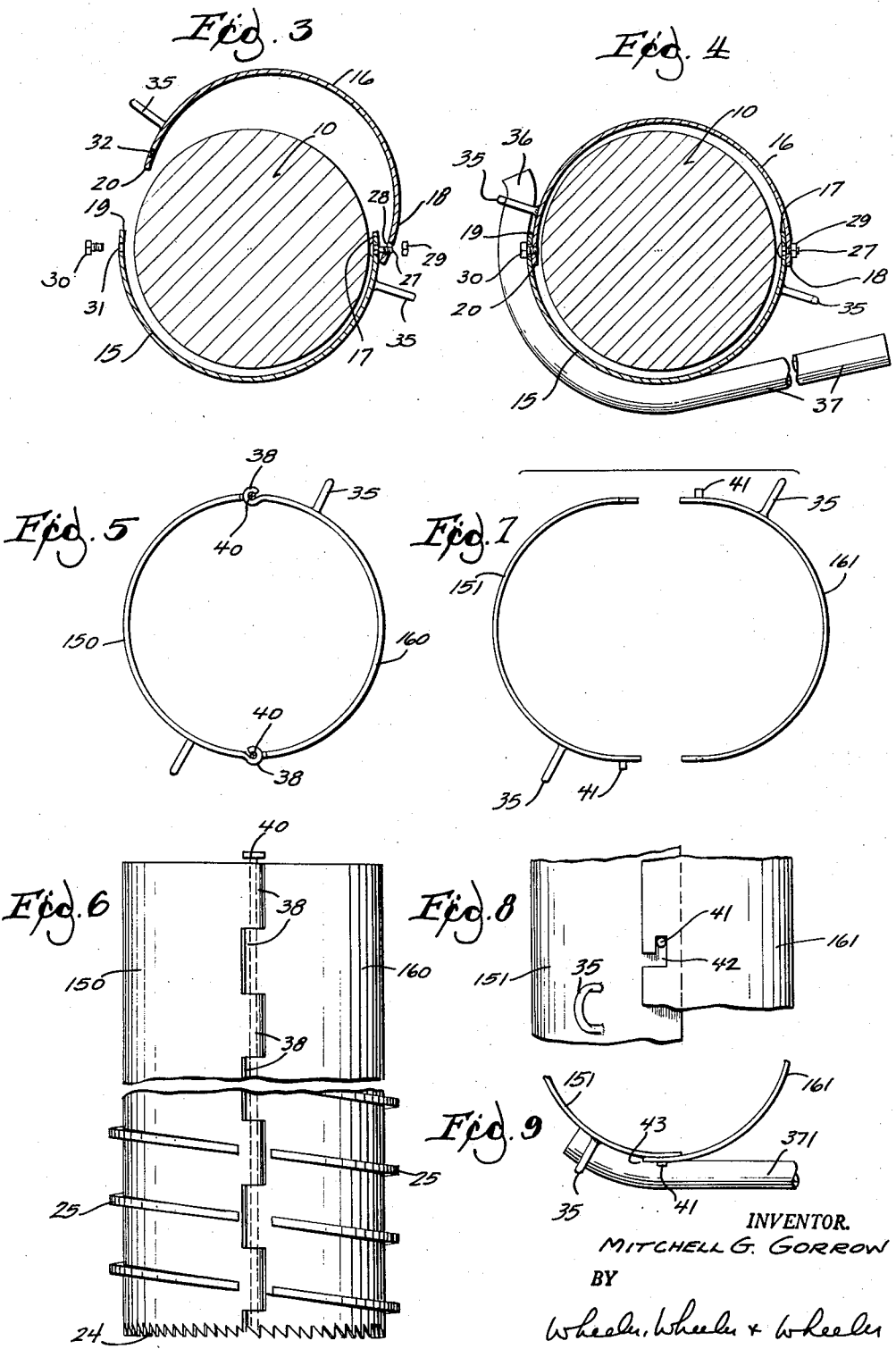

2,897,553
UTILITY POLE REINFORCEMENT

Mitchell G. Gorrow, Appleton, Wis.

Application December 11, 1957, Serial No. 702,081

7 Claims. (Cl. 20—100)

This invention relates to utility pole reinforcement.

Although there are many patented reinforcing devices which involve the application of split sleeves about portions of utility poles which have rotted at ground level, none of these has proved satisfactory and the industry continues to use expensive and unsightly repairs of the type known as "stubbing."

Decay of wooden poles occurs primarily at or near the ground line as a result of wood-destroying fungi which grow adjacent the surface of the ground. The base or butt of the pole may be perfectly sound, and that portion of the pole above ground level may be sound but the pole may be weakened by ground rot localized at ground level. Relocation of the overhead equipment on the pole generally greatly exceeds the cost of the pole itself. Accordingly it is conventional practice to set a wood stub beside the weakened pole and bind the newly set stub to the old pole above the weakened point.

Sometimes the rotted wood is cleared from the weakened area and remaining wood is coated with a preservative salt. However, porcupines and other animals eat the remaining sound wood to get the salt. The present invention protects the pole.

Wood stubs are normally treated with preservative and are twelve feet to fifteen feet in length. Some utilities use a malleable iron reinforcement which is banded and bolted to the pole. Others use precast concrete stubs and still others use channel irons driven into the ground. In all of these practices, costly materials and labor are involved and the stubbed pole is sufficiently unsightly and so much adjoining pavement is damaged that many cities object to pole stubbing.

The present invention contemplates the use of a split tube which may conveniently be galvanized and which is not driven into the ground or placed into a prepared hole in the ground but is put together about the pole above ground level and is provided with cutting teeth and threads which function to enable the split tube to screw its way into the earth when pressure is exerted while the tube is rotated about the pole as a center. The internal diameter of the tube is so selected as to correspond closely to the butt diameter of the pole so that in the final position of the tube there will be little or no clearance between the tube and the lower end of the pole. An internal rib or flange substantially spans the space between intermediate portions of the tube and the pole and provides a seat against which a cementitious or asphaltic filler can be inserted to close the upper end of the tube about the pole. Below this rib or flange a fungicide preparation is pumped into the tube for the treatment of those portions of the pole where the rotting has occurred.

While it is contemplated that my split sleeve may be rotated by power, one of its advantages lies in the fact that it can be positioned by hand. Because of its lightness in weight, it can be carried by one man to inaccessible spots such as swampy land or hilly country where roads are not available. Moreover, it fits snugly to the pole and therefore better performs its function by reason of the fact that it is rotated into position instead of being driven into position. The pole which is to be strengthened becomes an active element in the practice of my reinforcing method, for the pole serves as a fixed center or guide upon which the split sleeve rotates and against which the rotating leverage thrust is exerted.

In the drawings:

Fig. 1 is a view partially in side elevation and partially in section showing the application to a locally rotted pole of a reinforcing split sleeve according to the present invention, portions of the split sleeve being broken away.

Fig. 2 is a view in perspective showing the relatively separated component parts of the split sleeve made according to the present invention.

Fig. 3 is a view in transverse section showing the application of a split sleeve to a pole in accordance with the invention.

Fig. 4 is a view in transverse section similar to Fig. 3 showing a specially designed lever in use for the purpose of rotating the sleeve about the pole to advance it into pole bracing position.

Fig. 5 is a plan view of a modified split sleeve embodiment of the invention.

Fig. 6 fragmentarily illustrates in side elevation the split sleeve of Fig. 5.

Fig. 7 is a plan view of relatively separated split sleeve parts constituting a further modified embodiment of the invention.

Fig. 8 fragmentarily illustrates the upper end of a split sleeve assembled from the parts shown in Fig. 7.

Fig. 9 is a fragmentary detail view showing the application of a special operating lever for manipulating the device of Fig. 7 and Fig. 8.

While the invention is not limited in its application, it will ordinarily be used on utility poles. These are quite well standardized as to length and class. A class 5 western cedar pole thirty feet in length has a diameter of approximately 9.7 inches at a point six feet above its butt. A similar fifty foot pole has a corresponding diameter of 12.9 inches. For this field of usage, four or five different sizes of sleeves will adequately serve the various sizes of poles.

It is desired that the internal diameter of the sleeve should correspond closely with the cross section of the pole at the lowest level to which the sleeve will be forced. At the point of application of the sleeve above the ground, the sleeve should desirably be two to three inches larger in diameter than the pole to allow one to one and a half inches of radial clearance between the sleeve and all sides of the pole. The specific dimension is not too important provided only that the sleeve, as applied, fits sufficiently closely to the pole to perform its reinforcing function.

In Figs. 1, 3 and 4 a pole requiring reinforcement is shown at 10. The butt end portion 11 of the pole is still sound but adjacent the surface of the ground 12 there is localized rotting as shown at 13 in Fig. 1.

The reinforcing split sleeve of the present invention comprises two tubular segments 15 and 16 which may be slightly more than 180° in arcuate extent so that their margins 17, 18 and their margins 19, 20 lap each other in a direction in which the outer exposed margin trails in the direction in which the split sleeve is rotated when assembled on the pole (Fig. 4).

The particular device shown is intended to be rotated in a counterclockwise direction for driving it into the earth about the pole. The lower end portions 22, 23 of the sleeve sections 15 and 16 are terminally toothed at 24, the teeth being arranged to cut their way into the soil when the assembled sleeve is rotated counterclockwise. Externally both sections are provided with helically pitched ribs 25 about their lower ends, these also being arranged to engage the soil in a direction such that the split sleeve will be urged downwardly about the pole when the assembled sleeve is rotated counterclockwise as viewed in Fig. 4.

A variety of means may be employed for connecting the split sleeve sections 15 and 16. In the construction shown in Figs. 2, 3 and 4, the section 15 is provided near its margin 17 with outwardly projecting studs at 27 for which the sleeve section 16 is provided along its margin 18 with registering holes 28. The studs 27 are desirably threaded to receive nuts 29 as shown in Figs. 3 and 4.

At the other margins 19 and 20 of the respective sections 15 and 16, there are holes for cap screws 30, the holes 31 in margin 19 being sufficiently large to pass the threads of the cap screws, while the holes 32 in the margin 20 of section 16 are tapped to provide an anchorage for the cap screws. The parts are assembled in the manner shown in Fig. 3 and Fig. 4, the placement of the cap screws completing the anchorage of margin 19 of section 15 over the leading margin 20 of section 16.

One or both of the sections may be provided with straps 35 for the reception of the hooked end portions 36 of the lever 37 by which the assembled split sleeve may be rotated upon the pole. These straps should be below the top of the sleeve at a lever which will be approximately at ground level when the sleeve is in its final position. In practice this would locate the strap 35 about five or six feet below the top of the split sleeve.

The construction of Figs. 5 and 6 is one in which the section 150 and the section 160 of the split sleeve have alternate integral hinge eyes 38 along their respective margins, these being adapted, when in registry, to receive the pitles 40 which lock the sections together.

In the construction shown in Figs. 7 to 9, the connection between the parts is made by the provision of fixed pins 41 projecting from the leading margins of the respective sections 151, 161, the trailing margins of respective sections having keyhole slots at 42 in which the pins 41 may be engaged. In order to relieve the pegs of the thrust exerted by the lever 371, the lever may have a shoulder at 43 which interlockingly engages the trailing margin of section 161 to transmit thrust directly to such margin when the lever is in use.

As already indicated, the internal cross section of the assembled split sleeve should match as closely as possible the cross section of the pole 11 at the depth to which the sleeve will be forced when rotated to screw its way downwardly into the earth about the pole 10. Fig. 1 shows the split sleeve in substantial contact with the pole at this point.

Near the upper end of the sleeve it is desirably provided with an internal rib or flange at 45 which, as clearly shown in Figs. 1 and 2, substantially extends to the pole to eliminate radial clearance at that level.

After the split sleeve is placed about the pole in the manner shown in Fig. 1 a pressure gun may be used to inject through the openings at 47 a fungicidal filler 48 which may be a greasy protective compound containing penta-chlorophenol. This compound desirably fills all voids between the pole and the split sleeve. If ground has entered the space between the pole and the sleeve during the placement of the sleeve, the fungicidal compound will penetrate throughout porous earth when injected through the openings 47. It is only required that voids be substantially filled to exclude air from the pole, since no particular reinforcing contact between the sleeve and the pole is required at this level. The material pumped into 47 will penetrate into the decayed portion of the pole, destroying fungi and preserve the remaining good wood.

The flange or rib 45 supports a thrust transmitting filler 50 inserted between the pole and the sleeve through the open upper end of the sleeve. This filler may comprise a Portland cement mix, but it has also been found satisfactory to use a bituminous compound such as is employed for black topping highways. In either case the hardening of the filler will supplement the direct contact of the flange or rib 45 with the wood to stabilize the pole within the upper end of the reinforcing sleeve.

The close fit of the sleeve to the pole is a distinct advantage from a number of standpoints. In the first place, if the pole is set in earth which contains rocks or is, perhaps, set in a hole which was bored in bedrock, the close fit of the sleeve to the pole minimizes potential interference of the rock with the entry of the sleeve. In the second place, the close fit minimizes the amount of filler required and enhances the reinforcing value of the split sleeve. In the third place, the appearance of the repair job is greatly improved. Finally, the pole is better enabled to perform its function of guiding the sleeve as the latter is rotated upon the pole as a means of causing it to penetrate the earth.

The rotation as a means of placing the sleeve at the desired level at the bottom of the pole also performs a number of functions. The sleeve may be much lighter than would be the case if it had to be driven, since the driving pressure will necessarily deform the upper margin of a sleeve otherwise strong enough to provide the necessary reinforcement for the pole. In the second place, the power requirements and the equipment requirements are minimized when the sleeve is screwed into position. In the third place, the sleeve may be fitted more closely to the pole, thus achieving some of the other objectives above noted.

I claim:

1. As a new article of manufacture, a split sleeve for reinforcement of a pole standing in the earth, the said sleeve comprising sections having means for connecting the sections about the standing pole, the internal cross section of the connected sections closely approximating the cross section of the pole at the level at which it will be engaged by the lower end of said sections, and the sections being externally provided with screwthread means pitched to screw the connected sections into the earth when the sections are rotated upon the pole about which they are connected.

2. The article of claim 1 in which the sections have lapping margins, the trailing margins of respective sections being external to the leading margins of the complementary section as viewed in the direction of rotation when the connected sections are being screwed into the earth.

3. The article of claim 1 in which the sections are substantially of uniform cross section as connected, with the exception that at a point remote from their lower ends, the sections are proviided with rib means of such radial extent as substantially to fill the clearance between the sections and the pole at the level at which such rib means stand in the final reinforcing position of the sertions.

4. The article of claim 1 in which at least one of the sections has radially projecting connectors fixed along one of its margins, the other section having complementary apertures in which said connectors are receivable in the assembly of said sections.

5. The article of claim 1 in which the respective sections have mutually offset and registrable hinge eyes, and a locking pin extends through said eyes to effect connection between said sections.

6. A device for the reinforcement in situ of a pole standing in earth and rotted adjacent ground level, said device comprising a split sleeve having pole-encircling peripheral portions, means for terminally connecting such portions to each other about such a pole, screw thread means disposed externally upon the split sleeve and adapted on rotation of the sleeve upon the pole to advance the sleeve into the earth in which the pole is standing, the pole guiding the sleeve during such rotation and advance.

7. The device of claim 6 in which the sleeve has terminal tooth means at its lower end to facilitate its entry into said earth.

References Cited in the file of this patent

UNITED STATES PATENTS

| | | |
|---|---|---|
| 206,078 | Bowes | July 16, 1878 |
| 913,482 | Ette | Feb. 23, 1909 |
| 2,470,149 | Derby | May 17, 1949 |